US012776679B2

(12) United States Patent
Boris et al.

(10) Patent No.: US 12,776,679 B2
(45) Date of Patent: Oct. 27, 2026

(54) ELECTRIC MACHINE AND STATOR FOR IT WITH IMPROVED ARRANGEMENT OF CONDUCTORS OF A STATOR WINDING

(71) Applicant: Valeo eAutomotive Germany GmbH, Erlangen (DE)

(72) Inventors: Dotz Boris, Bad Neustadt a.d. Saale (DE); Ibrahim Afinowi, Bad Neustadt a.d. Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 137 days.

(21) Appl. No.: 18/557,154

(22) PCT Filed: Apr. 21, 2022

(86) PCT No.: PCT/EP2022/060573

§ 371 (c)(1),
(2) Date: Oct. 25, 2023

(87) PCT Pub. No.: WO2022/228999

PCT Pub. Date: Nov. 3, 2022

(65) Prior Publication Data

US 2024/0223036 A1 Jul. 4, 2024

(30) Foreign Application Priority Data

Apr. 29, 2021 (DE) ..................... 10 2021 204 303.8

(51) Int. Cl.
*H02K 3/28* (2006.01)
*B60K 1/00* (2006.01)
(Continued)

(52) U.S. Cl.
CPC ................. *H02K 3/28* (2013.01); *B60K 1/00* (2013.01); *H02K 5/1732* (2013.01); *H02K 7/083* (2013.01)

(58) Field of Classification Search
CPC ........................................................ H02K 3/28
(Continued)

(56) References Cited

U.S. PATENT DOCUMENTS

| | | | | |
|---|---|---|---|---|
| 11,855,498 | B2 * | 12/2023 | Deshpande | H02K 3/12 |
| 12,301,083 | B2 * | 5/2025 | Wu | H02K 3/28 |

(Continued)

FOREIGN PATENT DOCUMENTS

| | | | |
|---|---|---|---|
| CN | 107565720 | A | 1/2018 |
| CN | 212462918 | U | 2/2021 |

(Continued)

OTHER PUBLICATIONS

International Search Report mailed on Aug. 23, 2022 in PCT/EP2022/060573 filed on Apr. 21, 2022, 2 pages.

(Continued)

*Primary Examiner* — Oluseye Iwarere
*Assistant Examiner* — Minki Chang
(74) *Attorney, Agent, or Firm* — Oblon, McClelland, Maier & Neustadt, L.L.P.

(57) ABSTRACT

A stator for an electric machine is specified in which electrical conductors of a stator winding are arranged, layered only radially in a plurality of layers, in a stator slot. Two stator slots which are arranged next to one another are combined to form blocks (G) of one phase (U, V, W). In the blocks (G), positions occupied by the electrical conductors are described by column numbers S and layer numbers L which are defined by a start position and incremental values. Also specified are an electric machine having such a stator and a vehicle having such an electric machine.

20 Claims, 9 Drawing Sheets

(51) Int. Cl.
*H02K 5/173* (2006.01)
*H02K 7/08* (2006.01)

(58) Field of Classification Search
USPC .................................................. 310/185, 207
See application file for complete search history.

(56) References Cited

U.S. PATENT DOCUMENTS

| | | | | |
|---|---|---|---|---|
| 2014/0125187 | A1 | 5/2014 | Suzuki et al. | |
| 2016/0146703 | A1 | 5/2016 | Akazaki et al. | |
| 2016/0164359 | A1 | 6/2016 | Han et al. | |
| 2020/0227985 | A1 | 7/2020 | Dotzel et al. | |
| 2021/0376680 | A1* | 12/2021 | Yang | H02K 3/28 |
| 2022/0140683 | A1* | 5/2022 | Zhu | H02K 3/12<br>310/71 |
| 2022/0158512 | A1 | 5/2022 | Deshpande et al. | |
| 2024/0322629 | A1 | 9/2024 | Wu | |

FOREIGN PATENT DOCUMENTS

| | | | |
|---|---|---|---|
| DE | 10 2009 002 928 | A1 | 11/2010 |
| DE | 10 2013 111 995 | A1 | 5/2014 |
| DE | 10 2015 223 202 | A1 | 5/2016 |
| DE | 10 2017 201 533 | A1 | 8/2018 |
| DE | 10 2018 125 837 | A1 | 4/2020 |
| EP | 1 109 294 | A2 | 6/2001 |
| EP | 3 029 810 | A2 | 6/2016 |
| FR | 3 099 661 | A1 | 2/2021 |
| JP | 2015-84635 | A | 4/2015 |
| WO | WO-2019/116918 | A1 | 6/2019 |
| WO | WO 2020/192181 | A1 | 10/2020 |

OTHER PUBLICATIONS

Office Action received Mar. 28, 2022, in corresponding Germany Patent Application No. 10 2021 204 303.8 (with English Translation of Category of Cited Documents), 15 pages.

English translation of international Preliminary Report on Patentability and Written Opinion Issued Oct. 24. 2023 in PCT/EP2022/060573, 9 pages.

Japanese Office Action Issued Jan. 7, 2025 in Japanese Patent Application No. 2023-566558, 6 pages.

Indian Office Action issued Oct. 15, 2025, in corresponding Indian Patent Application No. 202347075677 (with English Translation), 9 pages.

* cited by examiner

ELECTRIC MACHINE AND STATOR FOR IT WITH IMPROVED ARRANGEMENT OF CONDUCTORS OF A STATOR WINDING

TECHNICAL FIELD

The invention relates to a stator for an electric machine, to an electric machine having such a stator, and to a vehicle having such an electric machine.

BACKGROUND

A multiplicity of schemes for the arrangement of conductors of a stator winding has been proposed for electric machines. Nevertheless, there is no solution in which the start and end points of the various winding strings of a phase at the two ends of the stator are arranged, on the one hand, physically close to one another and therefore can be easily connected to one another but which, on the other hand, also enables a flexible interconnection of the phases.

SUMMARY OF THE INVENTION

It is therefore an object of the invention to specify an improved stator for an electric machine, an improved electric machine having such a stator and an improved vehicle having such an electric machine. In particular, the abovementioned properties are intended to be achieved.

The object of the invention is achieved by a stator for an electric machine which comprises a stator lamination stack having a plurality of stator slots which run parallel to an axis of rotation of the electric machine and in which in each case a plurality of electrical conductors of a stator winding are arranged, wherein

- electrical conductors are arranged in a stator slot layered only radially in a plurality of layers,
- two stator slots arranged next to one another accommodate electrical conductors of one phase and are combined in each case to form blocks,
- blocks of one phase are distributed regularly in the stator lamination stack,
- two successive blocks of one phase form a pole pair,
- blocks of different phases are arranged next to one another,
- each phase is divided into four winding strings, which each have a plurality of series-connected electrical conductors,
- positions occupied in the blocks by the electrical conductors are described by column numbers S and layer numbers L, wherein the layers are numbered with the layer numbers L increasing from the outside inwards, and wherein the stator slots of a block are numbered with the column numbers S,
- the positions to be occupied successively by the conductors in adjacent blocks of the same phase are defined by a start position and incremental values, wherein the incremental values describe the change from one block to the next block of the same phase in a first circumferential direction,
- the patterns a and a' in the following table indicate start values and the patterns b, b', c and d indicate incremental values,

| | S | L |
|---|---|---|
| a | 2 | 1 |
| a' | 1 | 1 |
| b | −1 | +1 |
| b' | +1 | +1 |
| c | 0 | −1 |
| d | 0 | +1 |

- per phase, a first winding string is described by a first basic pattern sequence a, b, d, b' beginning with a first block, and therefore a first pole pair is formed, wherein, for each pair of layers per block which oversteps two pairs of layers per block, alternately in each case one pattern sequence d, b or d, b' is attached to the first basic pattern sequence a, b, d, b', and wherein, for each additional pole pair, in each case one pattern sequence c, d is attached to in each case one pattern sequence a, b and to in each case one pattern sequence d, b' and to in each case one pattern sequence d, b,
- per phase, a second winding string is described by a second basic pattern sequence a', b', d, b beginning with a first block, and therefore the first pole pair is supplemented, wherein, for each pair of layers per block which oversteps two pairs of layers per block, alternately in each case one pattern sequence d, b' or d, b is attached to the second basic pattern sequence a', b', d, b, and wherein, for each additional pole pair, in each case one pattern sequence c, d is attached to in each case one pattern sequence a', b' and to in each case one pattern sequence d, b and to in each case one pattern sequence d, b',
- per phase, a third winding string is described by a series of positions to be occupied which corresponds to the series specified for the first winding string, wherein the series for the third winding string begins, however, with a second block which has been shifted with respect to the first block through a position in the first circumferential direction,
- per phase, a fourth winding string is described by a series of positions to be occupied which corresponds to the series specified for the second winding string, wherein the series for the fourth winding string begins, however, with a second block which has been shifted with respect to the first block through a position in the first circumferential direction, and
- the winding strings have start points in the first block and end points at the other open end.

The object of the invention is furthermore achieved by an electric machine which has a first bearing plate and a second bearing plate, a stator of the abovementioned type which is arranged between the two bearing plates and a rotor which is arranged in the stator and has a rotor shaft mounted rotatably in the two bearing plates.

Finally, the object is also achieved by a vehicle having at least two axles, of which at least one is driven, wherein said driving takes place at least partially or for part of the time by means of the abovementioned electric machine.

The disadvantages mentioned at the outset can be overcome with the aid of the proposed measures. In particular, this results in the following advantages:

- the start points of all of the winding strings of one phase are in the first block,
- the end points of the first and second winding strings of one phase are radially on the outside in one block, the end points of the third and fourth winding strings of one phase are radially on the inside in one block.

As a result, the individual phases can be interconnected in multiple ways.

At this point, it will be mentioned additionally that a current flows through electrical conductors of adjacent stator slots of one block during operation of the electric machine in identical directions.

Further advantageous configurations and developments of the invention arise from the dependent claims and the description when considered in conjunction with the figures.

It is favourable if the conductors are formed in pairs by the legs of a U-shaped bracket and the start points and end points of the winding strings are formed in each case by one end of such a leg. In this embodiment, one wide and one narrow U-shaped bracket result per pair of layers, which brackets emerge from the first block in the first and second winding strings and from the second block in the third and fourth winding strings. All of the remaining brackets have a medium width. Advantageously, a wide and a narrow bracket can be nested physically one inside the other.

It is furthermore advantageous if there is in each case precisely one other block between the first blocks of different phases. As a result, the start and end points of all of the winding strings are positioned physically close to one another and can therefore be electrically interconnected easily in different ways, as will be described below.

It is advantageous if the start points of the four winding strings of each phase are each connected to one another and the end points of the four winding strings of all of the phases are connected to one another to form a star point or the end points of the four winding strings of each phase are each connected to one another and the start points of the four winding strings of all of the phases are connected to one another to form a star point.

This results in a parallel circuit of all of the winding strings, which are interconnected to form a star point.

It is furthermore advantageous if the start points of the four winding strings of each phase are each connected to one another and if the end points of the first and second winding strings of all of the phases are connected to one another to form a first star point and if the end points of the third and fourth winding strings of all of the phases are connected to one another to form a second star point or if the end points of the four winding strings of each phase are each connected to one another and if the start points of the first and second winding strings of all of the phases are connected to one another to form a first star point and if the start points of the third and fourth winding strings of all of the phases are connected to one another to form a second star point.

This likewise results in a parallel circuit of all of the winding strings which are, however, interconnected to form two star points.

It is additionally advantageous if the first winding string and the fourth winding string of each phase are each connected in series and the second winding string and the third winding string of each phase are each connected in series and if the end points of the third winding strings and the fourth winding strings of all of the phases are connected to one another to form a star point or the start points of the first winding strings and the second winding strings of all of the phases are connected to one another to form a star point.

In this case, the winding strings are connected, in pairs, in series and in parallel, wherein all of the winding strings connected in series in pairs are interconnected to form a star point.

It is additionally advantageous if the first winding string and the fourth winding string of each phase are each connected in series and the second winding string and the third winding string of each phase are each connected in series and if the end points of the third winding strings of all of the phases are connected to one another to form a first star point and the end points of the fourth winding strings of all of the phases are connected to one another to form a second star point or the start points of the first winding strings of all of the phases are connected to one another to form a first star point and the start points of the second winding strings of all of the phases are connected to one another to form a second star point.

In this case, the winding strings are likewise connected, in pairs, in series and in parallel, wherein, however, all of the winding strings connected in series in pairs are interconnected to form two star points.

It is finally advantageous if the four winding strings of each phase, beginning with the first winding string increasing up to the fourth winding string, are each connected in series with one another and the end points of the fourth winding strings of all of the phases are connected to one another to form a star point or the start points of the first winding strings of all of the phases are connected to one another to form a star point.

In this case, the winding strings of each phase are connected in series, wherein the winding strings connected in series are interconnected to form a star point.

It is advantageous if the conductors are in the form of conductor bars. As a result, the conductor bars have two ends. During manufacture, the conductor bars can be inserted into the stator slots in the stator lamination stack from one side. After the insertion, the ends of the conductor bars can be connected to one another. This can take place, in particular, by means of welding.

It is favourable if the conductor bars are formed in pairs by the legs of a U-shaped bracket. That is to say that the conductor bars can be connected already before the insertion into the stator slots in the stator lamination stack on one side.

If the conductor bars have been formed in pairs by the legs of a U-shaped bracket, the ends of the conductor bars to be welded can be positioned on the same side of the stator lamination stack.

The pattern sequences a, b; d, b; d, b' can each be represented by the U-shaped brackets of the conductor bars. The connections between the pattern sequences can each be made by means of a welded joint between the ends of the conductor bars.

The conductor bars can be formed from a wire having a rectangular cross-sectional area.

A stator slot can have eight layers.

It is advantageous if the end points are arranged on the side of the welded joints between the ends of the conductor bars.

It is advantageous if the start points are arranged on the side of the welded joints between the ends of the conductor bars.

It is advantageous if the start points are electrically conductively connected to an inverter.

The above configurations and developments of the invention can be combined in any desired way.

BRIEF DESCRIPTION OF THE FIGURES

Exemplary embodiments of the invention are illustrated by way of example in the appended schematic figures. In the figures.

DETAILED DESCRIPTION OF THE INVENTION

It will be stated by way of introduction that identical parts in the different embodiments are provided with the same reference signs or the same component part designations, with different indices where appropriate. The disclosures of a component part contained in the description may accordingly be transferred to another component part with the same reference sign or the same component part designation. Also, the positional indications selected in the description, such as, for example, "top", "bottom", "rear", "front", "side" etc. relate to the figure directly described and illustrated and, in the event of a change in position, should be transferred accordingly to the new position.

Figure 1:
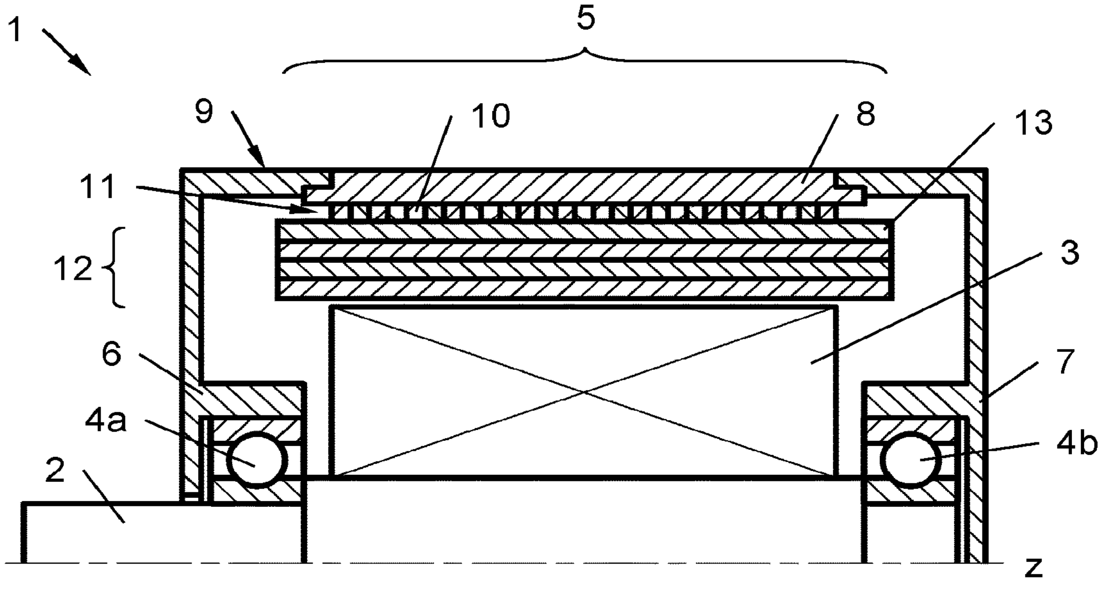
FIG. 1 shows an exemplary electric machine illustrated schematically in half-section.

FIG. 1 shows a half-section through a schematically illustrated electric machine 1. The electric machine 1 comprises a rotor shaft 2 having a rotor 3 (not illustrated in detail here) seated thereon, wherein the rotor shaft 2 is mounted with the aid of (rolling) bearings 4*a*, 4*b* so as to be rotatable about an axis of rotation A relative to a stator 5. Specifically, the first bearing 4*a* sits in a first front bearing plate 6, and the second bearing 4*b* sits in a second rear bearing plate 7. Furthermore, the electric machine 1 comprises a central housing part 8 which connects the front bearing plate 6 and the rear bearing plate 7 and accommodates the stator 5. In this example, the front bearing plate 6, the rear bearing plate 7 and the housing part 8 form the housing 9 of the electric machine 1.

In this example, the stator 5 has a plurality of stator laminations 10 which form a stator lamination stack 11 or a stator basic body. The stator 5 also has stator windings 12 which are arranged in the stator lamination stack 11 and are constructed from individual conductor bars 13 whose ends are connected, in particular welded, to one another.

Figure 2:
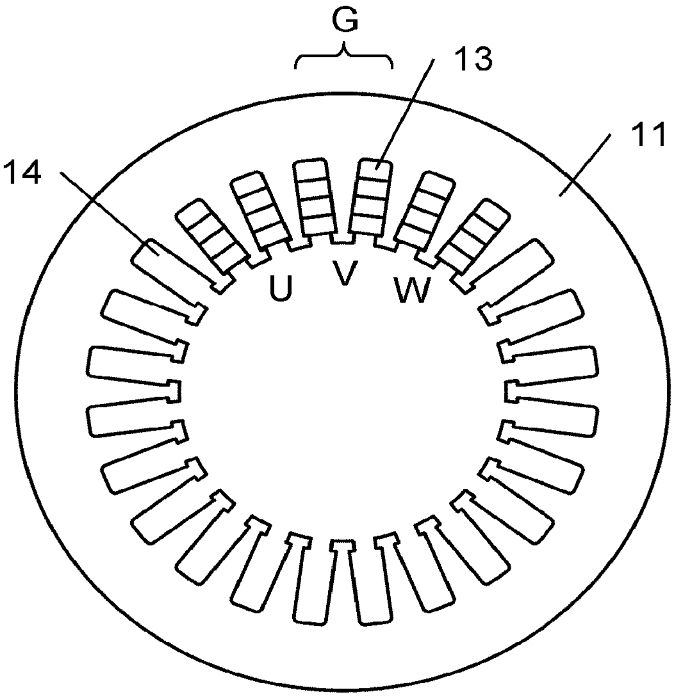
FIG. 2 shows an example of a stator lamination stack of an electric machine in a front view.

FIG. 2 shows an example of a stator lamination stack 11 of an electric machine 1 in a front view, wherein some of the stator slots 14 are occupied by conductor bars 13 of the stator winding 12. In particular, the following features of the proposed stator 5 can be seen in FIG. 2

- electrical conductors 13 are arranged in a stator slot 14, layered only radially in a plurality of layers (i.e. the electrical conductors are not arranged next to one another in the circumferential direction in a stator slot 14),
- two stator slots 14 arranged next to one another accommodate electrical conductors 13 of one phase U, V, W and are combined in each case to form blocks G,
- blocks G of one phase U, V, W are distributed regularly in the stator lamination stack 11,
- two successive blocks G of one phase U, V, W form a pole pair, and
- blocks G of different phases U, V, W are arranged next to one another.

Figure 3:
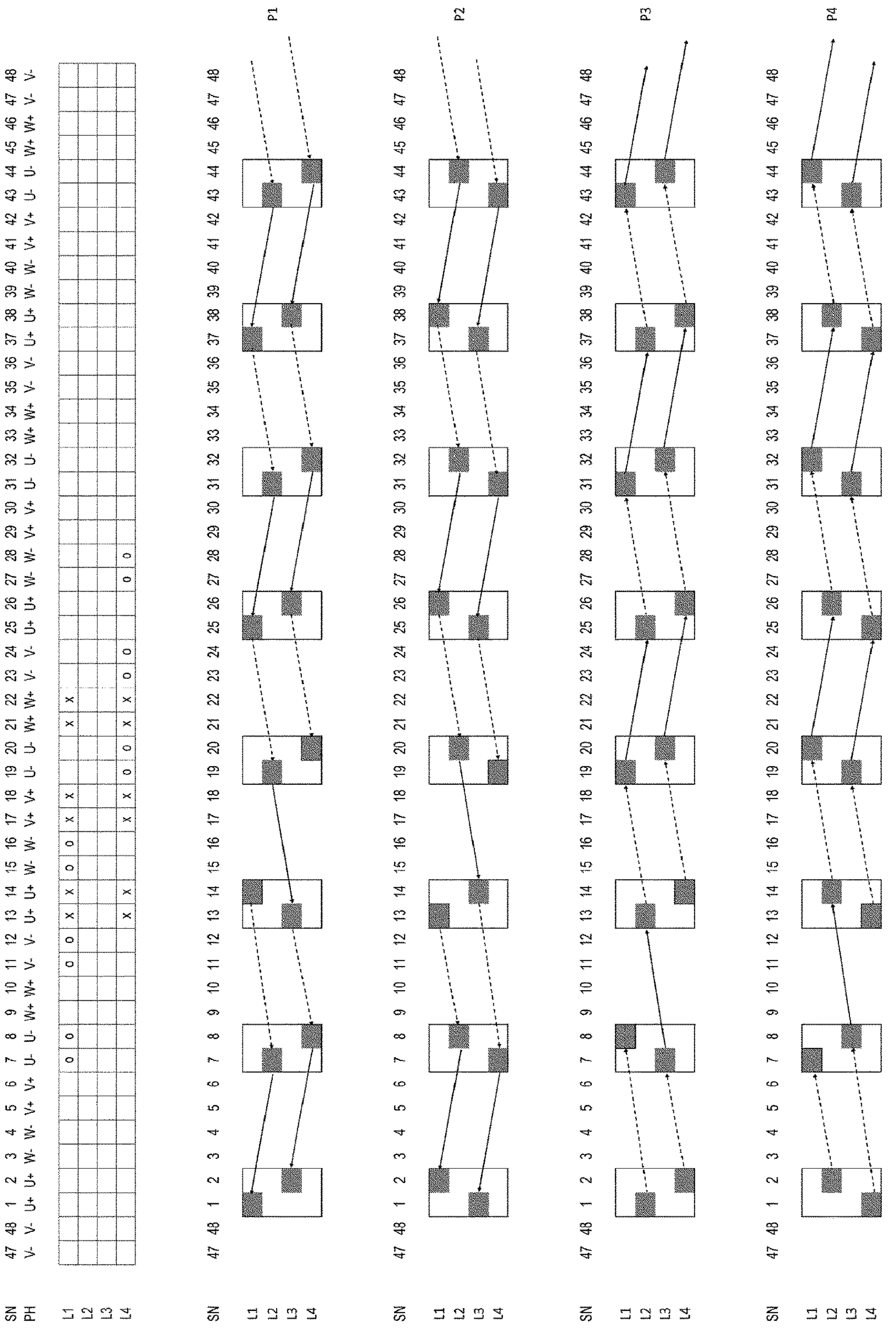
FIG. 3 shows a schematized development of the stator slots in a front view.

FIG. 3 now shows a schematized development of the stator slots 14 in a front view. In this case, the stator slots 14 are denoted by the stator slot number SN. As can be seen, the exemplary stator 5 has forty-eight stator slots 14. In the case of the phases PH, the associated polarity is also specified in addition to the letters for the respective phase. Therefore, "U+" is specified for the positive U phase, "U-" for the negative, and so on. Furthermore, the layers are denoted L1 . . . L4 in FIG. 3. The exemplary stator 5 therefore has four layers L1 . . . L4 per stator slot 14.

Figure 4:
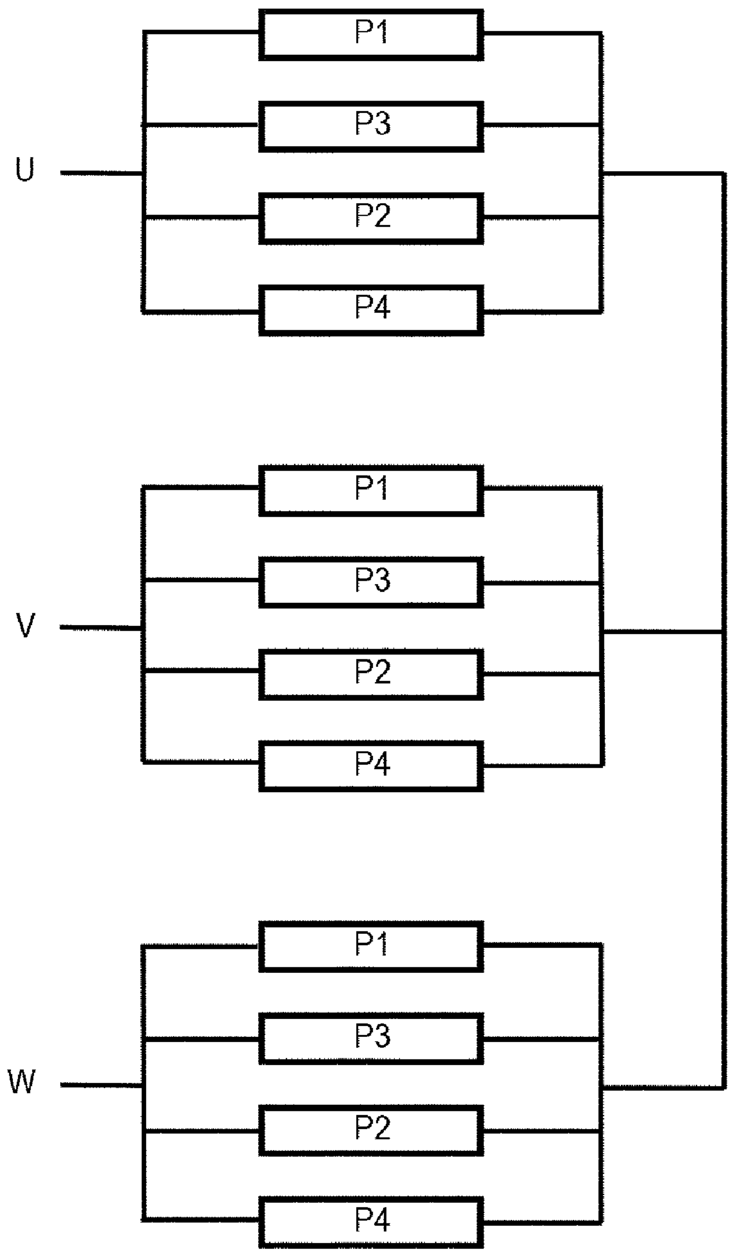
FIG. 4 shows an example of a parallel circuit of all of the winding strings which are interconnected to form a star point.

The hatched rectangles specify the position occupied in each case in a stator slot 14 by an electrical conductor 13. Connecting lines indicate which electrical conductors 13 are connected, wherein continuous connecting lines indicate electrical connections on a first end side of the stator 5 and dashed connecting lines indicate electrical connections on a second end side of the stator 5. In FIG. 4, the schemes as to how the electrical conductors 13 are arranged in the stator slots 14 are specified for four strings P1 . . . P4, wherein the uppermost scheme is assigned to string P1, the second scheme is assigned to string P2, the third scheme is assigned to string P3 and the lowermost scheme is assigned to string P4. Each phase U, V, W is divided into four winding strings P1 . . . P4, which each have a plurality of series-connected electrical conductors 13, wherein the scheme is illustrated as representative for the phase U in FIG. 2. The schemes for the phases V and W are, however, identical and merely shifted through the respective circumferential position.

The arrangement of the electrical conductors 13 is now as follows:

- in the blocks G, positions occupied by the electrical conductors 13 are described by column numbers S and layer numbers L, wherein the layers are numbered with the layer numbers L increasing from the outside inwards, and wherein the stator slots 14 of a block G are numbered with the column numbers S,
- the positions to be occupied successively by the conductors 13 in adjacent blocks G of the same phase U, V, W are defined by a start position and incremental values, wherein the incremental values describe the change from one block G to the next block G of the same phase U, V, W in a first circumferential direction, the patterns a and a' in the following table in this case indicate start values, and the patterns b, b', c and d indicate incremental values,

| | S | L |
|---|---|---|
| a | 2 | 1 |
| a' | 1 | 1 |
| b | −1 | +1 |
| b' | +1 | +1 |
| c | 0 | −1 |
| d | 0 | +1 |

Per phase U, V, W, a first winding string P1 is described by a first basic pattern sequence a, b, d, b' beginning with a first block G, and therefore a first pole pair is formed, wherein, for each pair of layers per block G which oversteps two pairs of layers per block G, alternately in each case one pattern sequence d, b or d, b' is attached to the first basic pattern sequence a, b, d, b', and wherein, for each additional pole pair, in each case one pattern sequence c, d is attached to in each case one pattern sequence a, b and to in each case one pattern sequence d, b' and to in each case one pattern sequence d, b.

In the specific example, this means the following:

The first winding string P1 begins in the block G which is denoted by the stator slots 14 with the stator slot numbers SN=13 and SN=14. If the block G is considered in isolation, the stator slot number SN=13 corresponds to the column number S=1, and the stator slot number SN=14 corresponds to the column number S=2. The layer number L=1 corresponds to the layer L1. For the pattern a, this now means that the position with the column number S=2 corresponding to the stator slot number SN=14 and with the layer number L=1 corresponding to the layer L1 is occupied by an electrical conductor 13. The corresponding position is illustrated by hatching in FIG. 3.

The winding strings P1 . . . P4 in the example shown have four layers L1 . . . L4 per block G and therefore two pairs of layers per block G and four pole pairs. The following scheme therefore results, wherein the pattern sequence a, b is combined to form the pattern pair A, the pattern sequence d, b' is combined to form the pattern pair B, and the pattern sequence c, d is combined to form the pattern pair C, for reasons of clarity.

| | | P1 | | P1 | |
|---|---|---|---|---|---|
| | | S | L | SN | L |
| A | a | 2 | 1 | 14 | L1 |
| | b | −1 | +1 | 7 | L2 |
| C | c | 0 | −1 | 1 | L1 |
| | d | 0 | +1 | 43 | L2 |
| C | c | 0 | −1 | 37 | L1 |
| | d | 0 | +1 | 31 | L2 |
| C | c | 0 | −1 | 25 | L1 |
| | d | 0 | +1 | 19 | L2 |
| B | d | 0 | +1 | 13 | L3 |
| | b' | +1 | +1 | 8 | L4 |
| C | c | 0 | −1 | 2 | L3 |
| | d | 0 | +1 | 44 | L4 |

-continued

| | | P1 | | P1 | |
|---|---|---|---|---|---|
| | | S | L | SN | L |
| C | c | 0 | −1 | 38 | L3 |
| | d | 0 | +1 | 32 | L4 |
| C | c | 0 | −1 | 26 | L3 |
| | d | 0 | +1 | 20 | L4 |

In the right-hand region of the table, the incremental values are solved and the absolute positions input. In this case, consideration should be given to the fact that, owing to the blocks for the phases V and W which are between the blocks G for the phase U, the number “6” additionally needs to be subtracted and the number “48” is added to negative values.

The second winding string P2 is formed in a very similar way. Specifically, the second winding string P2 is described by a second basic pattern sequence a', b', d, b beginning with a first block G, and therefore the first pole pair is supplemented, wherein, for each pair of layers per block G which oversteps two pairs of layers per block G, alternately in each case one pattern sequence d, b' or d, b is attached to the second basic pattern sequence a', b', d, b, and wherein, for each additional pole pair, in each case one pattern sequence c, d is attached to in each case one pattern sequence a', b' and to in each case one pattern sequence d, b and to in each case one pattern sequence d, b'.

In the specific example, the second winding string P2 again begins in the block G which is denoted by the stator slots 14 with the stator slot numbers SN=13 and SN=14. The pattern sequence a', b' is in this case combined to form the pattern pair A', the pattern sequence d, b is combined to form the pattern pair B', and the pattern sequence c, d is again combined to form the pattern pair C, for reasons of clarity. In the right-hand region of the table, the incremental values are solved and the absolute positions input.

| | | P2 | | P2 | |
|---|---|---|---|---|---|
| | | S | L | SN | L |
| A' | a' | 1 | 1 | 13 | L1 |
| | b' | +1 | +1 | 8 | L2 |
| C | c | 0 | −1 | 2 | L1 |
| | d | 0 | +1 | 44 | L2 |
| C | c | 0 | −1 | 38 | L1 |
| | d | 0 | +1 | 32 | L2 |
| C | c | 0 | −1 | 26 | L1 |
| | d | 0 | +1 | 20 | L2 |
| B' | d | 0 | +1 | 14 | L3 |
| | b | −1 | +1 | 7 | L4 |
| C | c | 0 | −1 | 1 | L3 |
| | d | 0 | +1 | 43 | L4 |
| C | c | 0 | −1 | 37 | L3 |
| | d | 0 | +1 | 31 | L4 |
| C | c | 0 | −1 | 25 | L3 |
| | d | 0 | +1 | 19 | L4 |

The third winding string P3 is described by a series of positions to be occupied which corresponds to the series specified for the first winding string P1, wherein the series for the third winding string P3 begins, however, with a second block G which has been shifted with respect to the first block G through a position in the first circumferential direction. Specifically, the third winding string P3 therefore begins in the block G which is denoted by the stator slots 14 with the stator slot numbers SN=7 and SN=8.

The fourth winding string P4 is finally described by a series of positions to be occupied which corresponds to the series specified for the second winding string P2, wherein the series for the fourth winding string P4 begins, however, with a second block G which has been shifted with respect to the first block G through a position in the first circumferential direction. Specifically, the fourth winding string P4 therefore in turn begins in the block G which is denoted by the stator slots 14 with the stator slot numbers SN=7 and SN=8.

In general, the winding strings P1 . . . P4 have start points in the first block G and end points at the other open end. This is visualized in FIG. 3 in the table at the top. There, the start points are denoted by “X” and the end points are denoted by “O”. It can also clearly be seen from this table that the start points X and the end points O of the individual winding strings P1 . . . P4 are positioned physically close together. Quite generally, the following advantages result from the proposed scheme:

- the start points X of all of the winding strings P1 . . . P2 of one phase U, V, W are in the first block G,
- the end points O of the first winding string P1 and the second winding string P2 of one phase U, V, W are radially on the outside in one block G,
- the end points O of the third winding string P3 and the fourth winding string P4 of one phase U, V, W are radially on the inside in one block G.

As a result, the winding strings can be interconnected in multiple ways without a large amount of interconnection complexity being involved.

It is also advantageous if the conductors 13 are formed in pairs by the legs of a U-shaped bracket and the start points X and end points O of the winding strings P1 . . . P4 are formed in each case by one end of such a leg. In this variant embodiment, one wide and one narrow U-shaped bracket result per pair of layers, which brackets emerge from the first block G in the first winding string P1 and the second winding string P2 and from the second block G in the third winding string P3 and the fourth winding string P4. All of the remaining brackets have a medium width. Advantageously, a wide and a narrow bracket can be nested physically one inside the other.

It is furthermore advantageous if there is in each case precisely one other block G between the first blocks G of different phases U, V, W. As a result, the start points X and end points O of all of the winding strings P1 . . . P4 are positioned physically close to one another and can therefore be electrically interconnected easily in different ways.

Examples of the electrical interconnection of the winding strings P1 . . . P4 are illustrated in FIGS. 4 to 8.

FIG. 4 shows an example in which the start points X of the four winding strings P1 . . . P4 of each phase U, V, W are in each case connected to one another and in which the end points O of the four winding strings P1 . . . P4 of all of the phases U, V, W are connected to one another to form a star point. Equivalently, it would also be possible for the end points O of the four winding strings P1 . . . P4 of each phase U, V, W to each be connected to one another and for the start points X of the four winding strings P1 . . . P4 of all of the phases U, V, W to be connected to one another to form a star point. This results in both cases in a parallel circuit of all of the winding strings P1 . . . P4 which are interconnected to form a star point.

Figure 5:
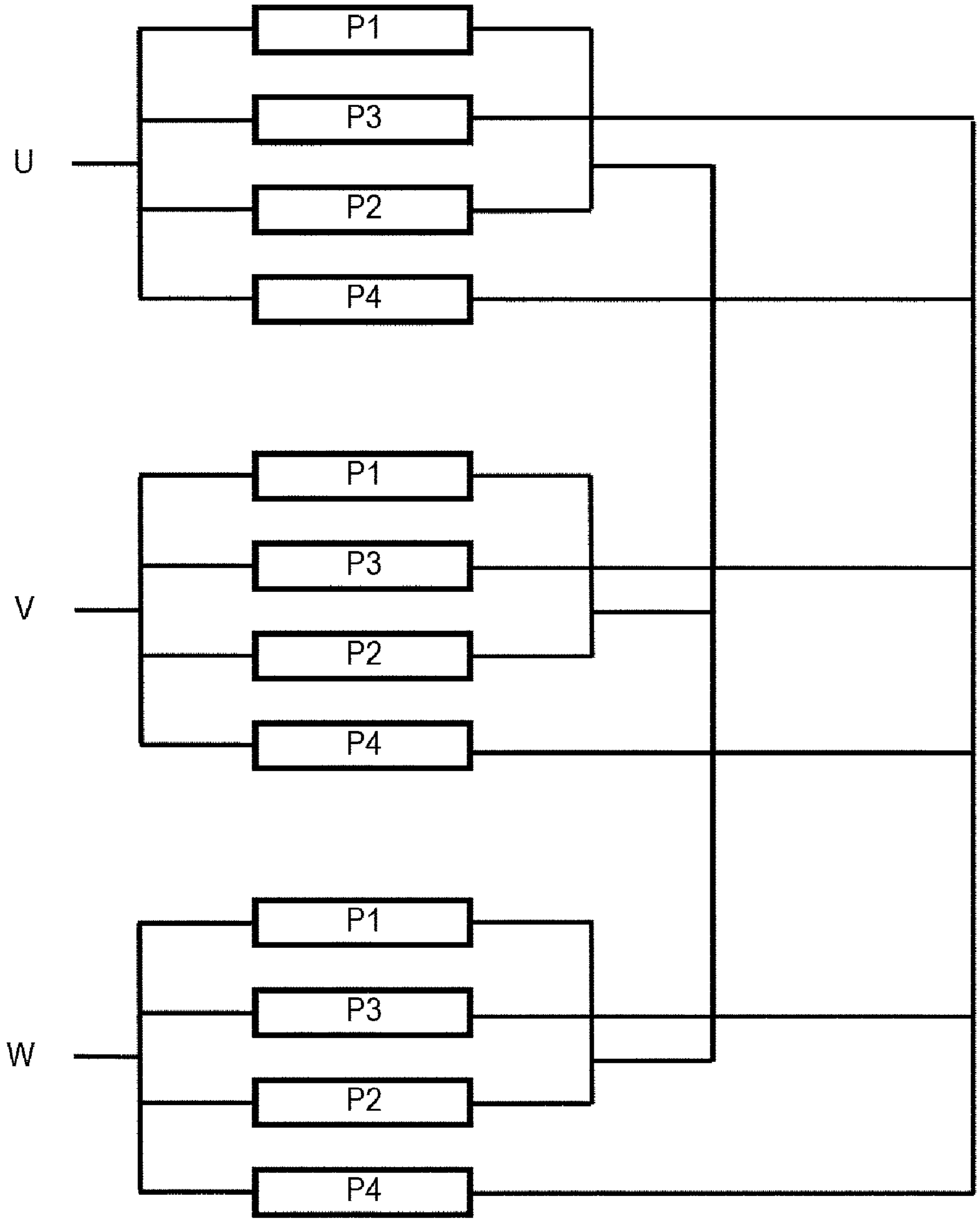
FIG. 5 shows an example of a parallel circuit of all of the winding strings which are interconnected to form two star points.

FIG. 5 shows an example in which the start points X of the four winding strings P1 . . . P4 of each phase U, V, W are each connected to one another and in which the end points O of the first and second winding strings P1, P2 of all of the phases U, V, W are connected to one another to form a first star point and in which the end points O of the third and fourth winding strings P3, P4 of all of the phases U, V, W are connected to one another to form a second star point. Equivalently, it would also be possible for the end points O of the four winding strings P1 . . . P4 of each phase U, V, W to each be connected to one another and for the start points X of the first and second winding strings P1, P2 of all of the strings U, V, W to be connected to one another to form a first star point and for the start points X of the third and fourth winding strings P3, P4 of all of the phases U, V, W to be connected to one another to form a second star point. This likewise results in both cases in a parallel circuit of all of the winding strings P1 . . . P4 which are nevertheless interconnected to form two star points.

Figure 6:
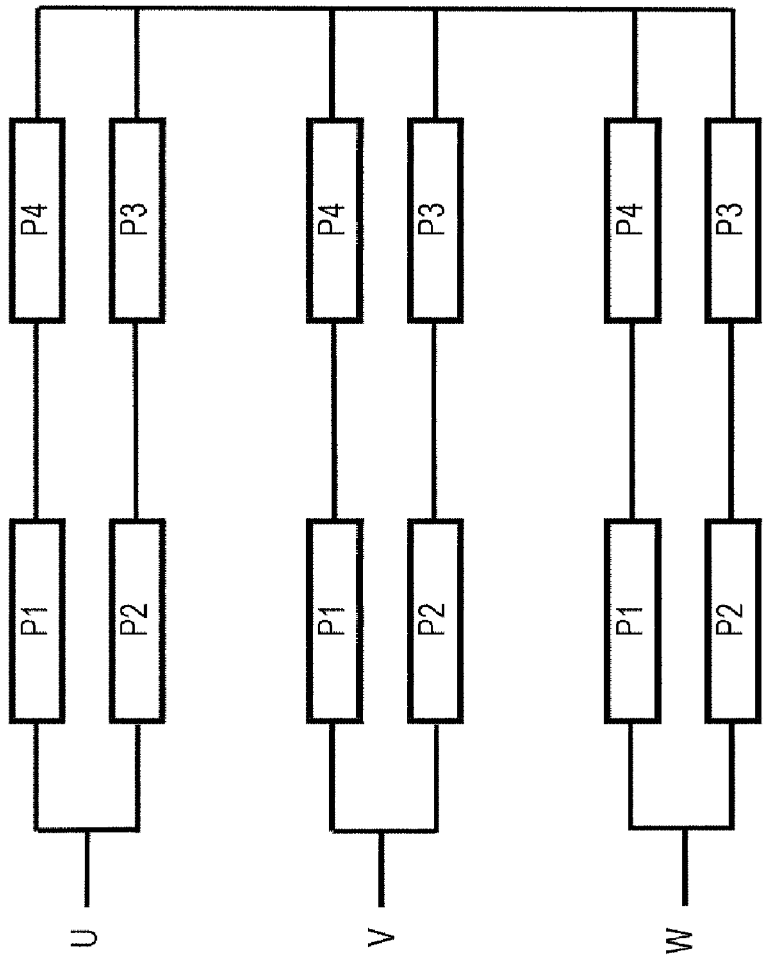
FIG. 6 shows an example in which the winding strings are connected, in pairs, in series and in parallel and the winding strings connected in series in pairs are interconnected to form a star point.

FIG. 6 shows an example in which the first winding string P1 and the fourth winding string P4 of each phase U, V, W are each connected in series and in which the second winding string P2 and the third winding string P3 of each phase U, V, W are each connected in series, wherein the end points O of the third winding strings P3 and fourth winding strings P4 of all of the phases U, V, W are connected to one another to form a star point or alternatively the start points X of the first winding strings P1 and second winding strings P2 of all of the phases U, V, W are connected to one another to form a star point. In this case, the winding strings P1 . . . P4 are connected, in pairs, in series and in parallel, wherein all of the winding strings P1 . . . P4 connected in series in pairs are interconnected to form a star point.

Figure 7:
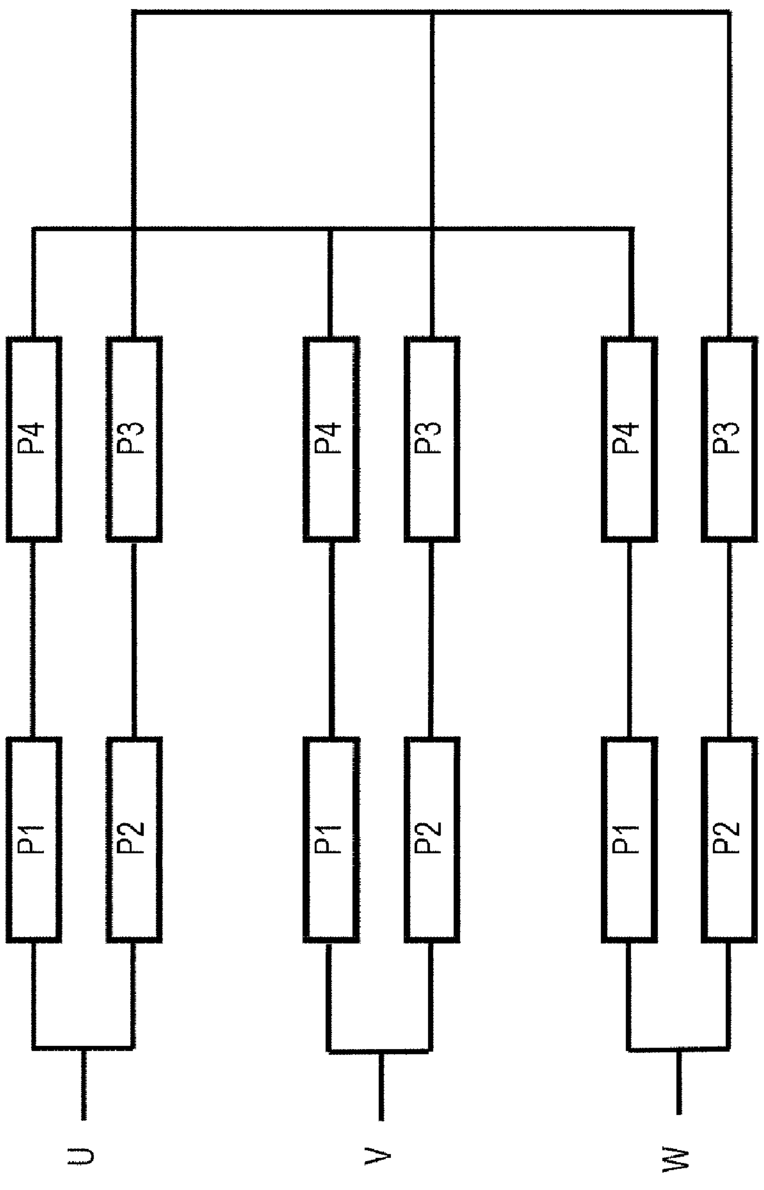
FIG. 7 shows an example in which the winding strings are connected, in pairs, in series and in parallel and the winding strings connected in series in pairs are interconnected to form two star points.

FIG. 7 shows an example in which the first winding string P1 and the fourth winding string P4 of each phase U, V, W are each connected in series and in which the second winding string P2 and the third winding string P3 of each phase U, V, W are each connected in series, wherein the end points O of the third winding strings P3 of all of the phases U, V, W are connected to one another to form a first star point and the end points O of the fourth winding strings P4 of all of the phases U, V, W are connected to one another to form a second star point or alternatively the start points X of the first winding strings P1 of all of the phases U, V, W are connected to one another to form a first star point and the start points X of the second winding strings P2 of all of the phases U, V, W are connected to one another to form a second star point. In this case, the winding strings P1 . . . P4 are likewise connected, in pairs, in series and in parallel, wherein, however, all of the winding strings P1 . . . P4 connected in series in pairs are interconnected to form two star points.

Figure 8:
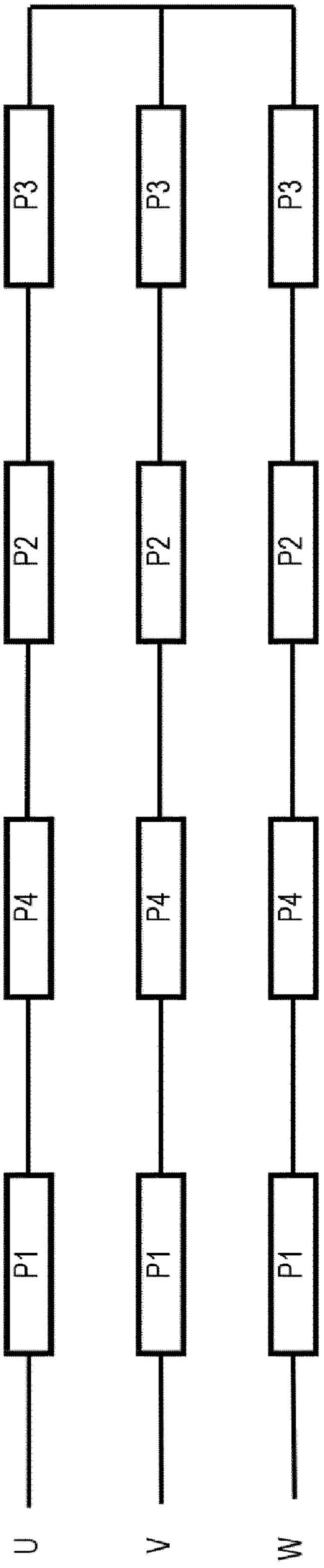
FIG. 8 shows an example of a series circuit of the winding strings which are interconnected to form a star point.

FIG. 8 finally shows an example in which the four winding strings P1 . . . P4 of each phase U, V, W, beginning with the first winding string P1 increasing up to the fourth winding string P4 are each connected in series with one another and in which the end points O of the fourth winding strings P4 of all of the phases U, V, W are connected to one another to form a star point or alternatively the start points X of the first winding strings P1 of all of the phases U, V, W are connected to one another to form a star point. In this case, the winding strings P1 . . . P4 of each phase are connected in series, wherein the winding strings P1 . . . P4 connected in series are interconnected to form a star point.

Figure 9:
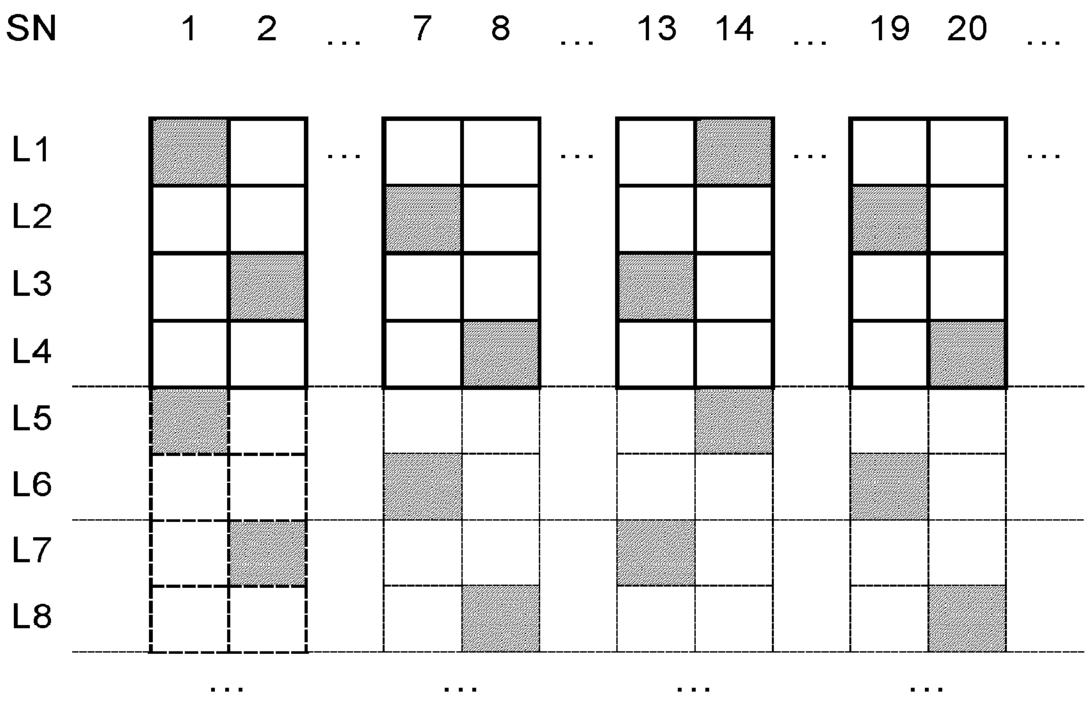
FIG. 9 shows one possible way of how the schemes shown can be extended for any desired number of pair of layers per block.

FIG. 9 shows a schematic illustration of how the schemes shown can be extended for any desired number of pair of layers per block G. It can be seen from FIG. 9 that the pattern is continued correspondingly for two pairs of layers starting from the basic pattern sequence.

Figure 10:
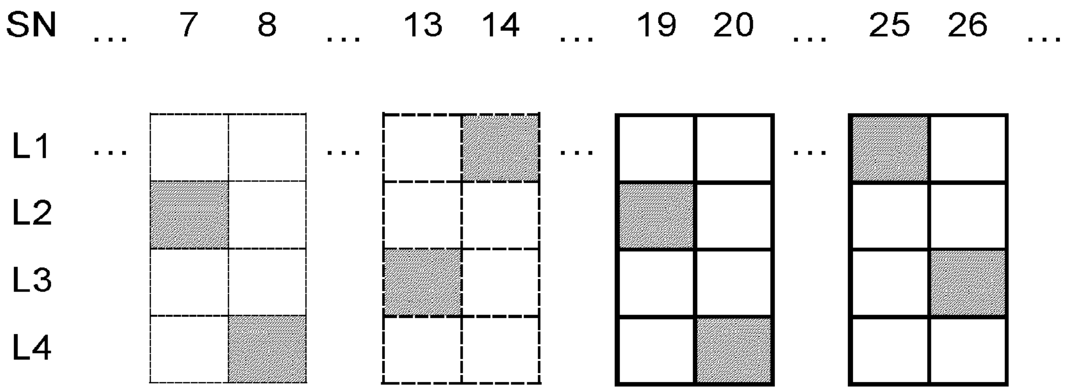
FIG. 10 shows one possible way of how the schemes shown can be extended for any desired number of pole pairs.

FIG. 10 shows a schematic illustration of how the schemes shown can be extended for any desired number of pole pairs. In this case, further pattern sequences are inserted between the basic pattern sequences.

In connection with FIGS. 9 and 10, the table below shows a scheme for an exemplary stator 5 having four pair of layers and four pole pairs.

| | | P1 | | | | P2 | |
|---|---|---|---|---|---|---|---|
| | | S | L | | | S | L |
| A | a | 2 | 1 | A' | a | 1 | 1 |
| | b | −1 | +1 | | b' | +1 | +1 |
| C | c | 0 | −1 | C | c | 0 | −1 |
| | d | 0 | +1 | | d | 0 | +1 |
| C | c | 0 | −1 | C | c | 0 | −1 |
| | d | 0 | +1 | | d | 0 | +1 |
| C | c | 0 | −1 | C | c | 0 | −1 |
| | d | 0 | +1 | | d | 0 | +1 |
| B | d | 0 | +1 | B' | d | 0 | +1 |
| | b' | +1 | +1 | | b | −1 | +1 |
| C | c | 0 | −1 | C | c | 0 | −1 |
| | d | 0 | +1 | | d | 0 | +1 |
| C | c | 0 | −1 | C | c | 0 | −1 |
| | d | 0 | +1 | | d | 0 | +1 |
| C | c | 0 | −1 | C | c | 0 | −1 |
| | d | 0 | +1 | | d | 0 | +1 |
| B' | d | 0 | +1 | B | d | 0 | +1 |
| | b | −1 | +1 | | b' | +1 | +1 |
| C | c | 0 | −1 | C | c | 0 | −1 |
| | d | 0 | +1 | | d | 0 | +1 |
| C | c | 0 | −1 | C | c | 0 | −1 |
| | d | 0 | +1 | | d | 0 | +1 |
| C | c | 0 | −1 | C | c | 0 | −1 |
| | d | 0 | +1 | | d | 0 | +1 |
| B' | d | 0 | +1 | B' | d | 0 | +1 |
| | b' | +1 | +1 | | b | −1 | +1 |
| C | c | 0 | −1 | C | c | 0 | −1 |
| | d | 0 | +1 | | d | 0 | +1 |
| C | c | 0 | −1 | C | c | 0 | −1 |
| | d | 0 | +1 | | d | 0 | +1 |
| C | c | 0 | −1 | C | c | 0 | −1 |
| | d | 0 | +1 | | d | 0 | +1 |

Figure 11:
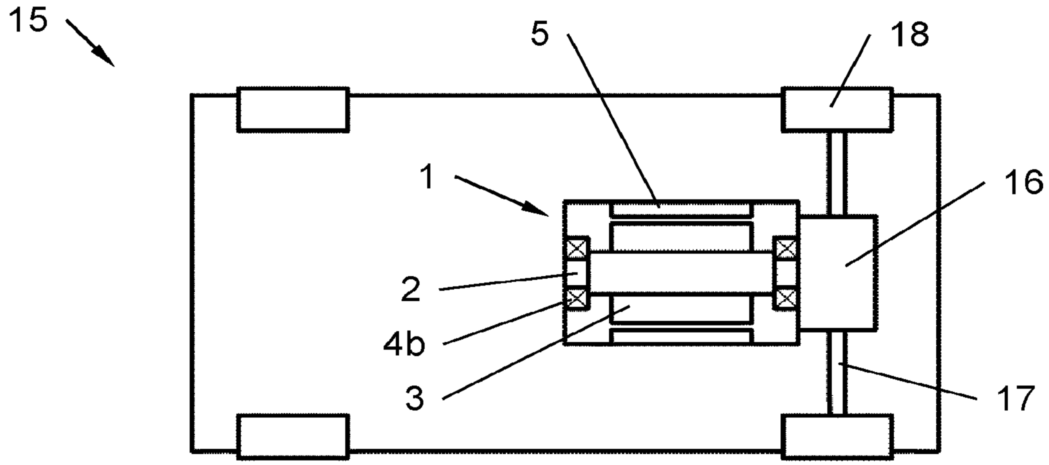
FIG. 11 shows an electric machine having a stator of the proposed type which is installed in a vehicle.

FIG. 11 finally shows the electric machine 1 installed in a vehicle 15. The vehicle 15 has at least two axles, of which at least one is driven. Specifically, the electric motor 1 is connected to a gear 16 which, in particular, can also perform the function of a differential gear. The half-shafts 17 of the rear axle adjoin the gear 16. Finally, the driven wheels 18 are mounted on the half-shafts 17. The driving of the vehicle 15 takes place at least partially or for part of the time by means of the electric machine 1. This means that the electric machine 1 may serve as the sole drive of the vehicle 15 or may be provided, for example, in conjunction with an internal combustion engine (hybrid drive).

Finally, it will also be stated that the scope of protection is determined by the patent claims. The description and the drawings should, however, be used to interpret the claims. The features contained in the figures may be interchanged and combined with one another as desired. In particular, it will also be stated that the apparatuses illustrated may in reality comprise even more or even fewer component parts than illustrated. In some cases, the illustrated apparatuses or their component parts may also be illustrated not to scale and/or on an enlarged scale and/or on a reduced scale.

The invention claimed is:

1. A stator for an electric machine, comprising a stator lamination stack having a plurality of stator slots which run parallel to an axis of rotation (z) of the electric machine and in which in each case a plurality of electrical conductors of a stator winding are arranged, wherein electrical conductors are arranged in a stator slot layered only radially in a plurality of layers, wherein two stator slots arranged next to one another accommodate electrical conductors of one phase (U, V, W) and are combined in each case to form blocks (G), blocks (G) of one phase (U, V, W) are distributed regularly in the stator lamination stack, two successive blocks (G) of one phase (U, V, W) form a pole pair, blocks (G) of different phases (U, V, W) are arranged next to one another, each phase (U, V, W) is divided into four winding strings (P1 . . . P4), which each have a plurality of series-connected electrical conductors, wherein positions occupied in the blocks (G) by the electrical conductors are described by column numbers S and layer numbers L, wherein the layers are numbered with the layer numbers L increasing from the outside inwards, and wherein the stator slots of a block (G) are numbered with the column numbers S, the positions to be occupied successively by the conductors in adjacent blocks (G) of the same phase (U, V, W) are defined by a start position and incremental values, wherein the incremental values describe the change from one block (G) to the next block (G) of the same phase (U, V, W) in a first circumferential direction, the patterns a and a' in the following table indicate start values and the patterns b, b', c and d indicate incremental values,

| | S | L |
|---|---|---|
| a | 2 | 1 |
| a' | 1 | 1 |
| b | −1 | +1 |
| b' | +1 | +1 |
| c | 0 | −1 |
| d | 0 | +1 |

per phase (U, V, W), a first winding string (P1) is described by a first basic pattern sequence a, b, d, b' beginning with a first block (G), and therefore a first pole pair is formed, wherein, for each pair of layers per block (G) which oversteps two pairs of layers per block (G), alternately in each case one pattern sequence d, b or d, b' is attached to the first basic pattern sequence a, b, d, b', and wherein, for each additional pole pair, in each case one pattern sequence c, d is attached to in each case one pattern sequence a, b and to in each case one pattern sequence d, b' and to in each case one pattern sequence d, b, per phase (U, V, W), a second winding string (P2) is described by a second basic pattern sequence a', b', d, b beginning with a first block (G), and therefore the first pole pair is supplemented, wherein, for each pair of layers per block (G) which oversteps two pairs of layers per block (G), alternately in each case one pattern sequence d, b' or d, b is attached to the second basic pattern sequence a', b', d, b, and wherein, for each additional pole pair, in each case one pattern sequence c, d is attached to in each case one pattern sequence a', b' and to in each case one pattern sequence d, b and to in each case one pattern sequence d, b', per phase (U, V, W), a third winding string (P3) is described by a series of positions to be occupied which corresponds to the series specified for the first winding string (P1), wherein the series for the third winding string (P3) begins, however, with a second block (G) which has been shifted with respect to the first block (G) through a position in the first circumferential direction, per phase (U, V, W), a fourth winding string (P4) is described by a series of positions to be occupied which corresponds to the series specified for the second winding string (P2), wherein the series for the fourth winding string (P4) begins, however, with a second block (G) which has been shifted with respect to the first block (G) through a position in the first circumferential direction, and the winding strings (P1 . . . P4) have start points (X) in the first block (G) and end points (O) at the other open end.

2. The stator (5) as claimed in claim 1, wherein the electrical conductors are formed in pairs by the legs of a U-shaped bracket, and the start points (X) and end points (O) of the winding strings (P1 . . . P4) are formed in each case by one end of such a leg.

3. The stator as claimed in claim 2, wherein there is in each case precisely one other block (G) between the first blocks (G) of different phases (U, V, W).

4. The stator as claimed in claim 2, wherein the start points (X) of the four winding strings (P1 . . . P4) of each phase (U, V, W) are each connected to one another, and in that the end points (O) of the four winding strings (P1 . . . P4) of all of the phases (U, V, W) are connected to one another to form a star point or the end points (O) of the four winding strings (P1 . . . P4) of each phase (U, V, W) are each connected to one another, and in that the start points (X) of the four winding strings (P1 . . . P4) of all of the phases (U, V, W) are connected to one another to form a star point.

5. The stator as claimed in claim 2, wherein the start points (X) of the four winding strings (P1 . . . P4) of each phase (U, V, W) are each connected to one another, and in that the end points (O) of the first winding strings (P1) and the second winding strings (P2) of all of the phases (U, V, W) are connected to one another to form a first star point, and in that the end points (O) of the third winding strings (P3) and the fourth winding strings (P4) of all of the phases (U, V, W) are connected to one another to form a second star point or the end points (O) of the four winding strings (P1 . . . P4) of each phase (U, V, W) are each connected to one another, and in that the start points (X) of the first winding strings (P1) and the second winding strings (P2) of all of the phases (U, V, W) are connected to one another to form a first star point, and in that the start points (X) of the third winding strings (P3) and the fourth winding strings (P4) of all of the phases (U, V, W) are connected to one another to form a second star point.

6. The stator as claimed in claim 2, wherein the first winding string (P1) and the fourth winding string (P4) of each phase (U, V, W) are each connected in series, in that the second winding string (P2) and the third winding string (P3) of each phase (U, V, W) are each connected in series and in that the end points (O) of the third winding strings (P3) and the fourth winding strings (P4) of all of the phases (U, V, W) are connected to one another to form a star point or the start points (X) of the first winding strings (P1) and the second winding strings (P2) of all of the phases (U, V, W) are connected to one another to form a star point.

7. The stator as claimed in claim 2, wherein the first winding string (P1) and the fourth winding string (P4) of each phase (U, V, W) are each connected in series, in that the second winding string (P2) and the third winding string (P3) of each phase (U, V, W) are each connected in series and in that the end points (O) of the third winding strings (P3) of all of the phases (U, V, W) are connected to one another to form a first star point, and in that the end points (O) of the fourth winding strings (P4) of all of the phases (U, V, W) are connected to one another to form a second star point or the start points (X) of the first winding strings (P1) of all of the phases (U, V, W) are connected to one another to form a first star point, and in that the start points (X) of the second winding strings (P2) of all of the phases (U, V, W) are connected to one another to form a second star point.

8. The stator as claimed in claim 1, wherein there is in each case precisely one other block (G) between the first blocks (G) of different phases (U, V, W).

9. The stator as claimed in claim 1, wherein the start points (X) of the four winding strings (P1 . . . P4) of each phase (U, V, W) are each connected to one another, and in that the end points (O) of the four winding strings (P1 . . . P4) of all of the phases (U, V, W) are connected to one another to form a star point or the end points (O) of the four winding strings (P1 . . . P4) of each phase (U, V, W) are each connected to one another, and in that the start points (X) of the four winding strings (P1 . . . P4) of all of the phases (U, V, W) are connected to one another to form a star point.

10. The stator as claimed in claim 1, wherein the start points (X) of the four winding strings (P1 . . . P4) of each phase (U, V, W) are each connected to one another, and in that the end points (O) of the first winding strings (P1) and the second winding strings (P2) of all of the phases (U, V, W) are connected to one another to form a first star point, and in that the end points (O) of the third winding strings (P3) and the fourth winding strings (P4) of all of the phases (U, V, W) are connected to one another to form a second star point or the end points (O) of the four winding strings (P1 . . . P4) of each phase (U, V, W) are each connected to one another, and in that the start points (X) of the first winding strings (P1) and the second winding strings (P2) of all of the phases (U, V, W) are connected to one another to form a first star point, and in that the start points (X) of the third winding strings (P3) and the fourth winding strings (P4) of all of the phases (U, V, W) are connected to one another to form a second star point.

11. The stator as claimed in claim 1, wherein the first winding string (P1) and the fourth winding string (P4) of each phase (U, V, W) are each connected in series, in that the second winding string (P2) and the third winding string (P3) of each phase (U, V, W) are each connected in series and in that the end points (O) of the third winding strings (P3) and the fourth winding strings (P4) of all of the phases (U, V, W) are connected to one another to form a star point or the start points (X) of the first winding strings (P1) and the second winding strings (P2) of all of the phases (U, V, W) are connected to one another to form a star point.

12. The stator as claimed in claim 1, wherein the first winding string (P1) and the fourth winding string (P4) of each phase (U, V, W) are each connected in series, in that the second winding string (P2) and the third winding string (P3) of each phase (U, V, W) are each connected in series and in that the end points (O) of the third winding strings (P3) of all of the phases (U, V, W) are connected to one another to form a first star point, and in that the end points (O) of the fourth winding strings (P4) of all of the phases (U, V, W) are connected to one another to form a second star point or the start points (X) of the first winding strings (P1) of all of the phases (U, V, W) are connected to one another to form a first star point, and in that the start points (X) of the second winding strings (P2) of all of the phases (U, V, W) are connected to one another to form a second star point.

13. The stator as claimed claim 1, wherein the four winding strings (P1 . . . P4) of each phase (U, V, W), beginning with the first winding string (P1) increasing up to the fourth winding string (P4), are each connected in series with one another, and in that the end points (O) of the fourth winding strings (P4) of all of the phases (U, V, W) are connected to one another to form a star point or the start points (X) of the first winding strings (P1) of all of the phases (U, V, W) are connected to one another to form a star point.

14. The stator as claimed in claim 1, wherein the electrical conductors are in the form of conductor bars.

15. The stator as claimed in claim 14, wherein the pattern sequences a, b; d, b; d, b' are each represented by the U-shaped brackets of the conductor bars.

16. The stator as claimed in claim 15, wherein the connections between the pattern sequences are each made by means of a welded joint between the ends of the conductor bars.

17. The stator as claimed in claim 14, wherein the conductors bars are formed from a wire having a rectangular cross-sectional area.

18. The stator as claimed in claim 1, wherein the stator slots each have eight layers.

19. An electric machine, characterized by a first bearing plate and a second bearing plate, a stator as claimed in claim 1 which is arranged between the two bearing plates, and a rotor which is arranged in the stator and has a rotor shaft mounted rotatably in the two bearing plates.

20. A vehicle having at least two axles, of which at least one is driven, characterized in that said driving takes place at least partially or for part of the time by means of the electric machine as claimed in claim 19.

* * * * *